(12) United States Patent
Ishida et al.

(10) Patent No.: US 10,322,362 B2
(45) Date of Patent: Jun. 18, 2019

(54) OIL SEPARATOR

(71) Applicant: TOKYO ROKI CO., LTD., Yokohama-shi, Kanagawa (JP)

(72) Inventors: Kosaku Ishida, Yokohama (JP); Yoshitaka Watanabe, Yokohama (JP)

(73) Assignee: TOKYO ROKI CO., LTD., Yokohama-shi, Kanagawa (JP)

( * ) Notice: Subject to any disclaimer, the term of this patent is extended or adjusted under 35 U.S.C. 154(b) by 183 days.

(21) Appl. No.: 15/512,749

(22) PCT Filed: Sep. 25, 2014

(86) PCT No.: PCT/JP2014/075470
§ 371 (c)(1),
(2) Date: Mar. 20, 2017

(87) PCT Pub. No.: WO2016/046942
PCT Pub. Date: Mar. 31, 2016

(65) Prior Publication Data
US 2017/0296956 A1    Oct. 19, 2017

(51) Int. Cl.
*B01D 45/14*    (2006.01)
*B04B 5/12*    (2006.01)
(Continued)

(52) U.S. Cl.
CPC .............. *B01D 45/14* (2013.01); *B01D 45/12* (2013.01); *B04B 1/08* (2013.01); *B04B 5/12* (2013.01);
(Continued)

(58) Field of Classification Search
CPC ................................. B01D 45/14; B04B 5/12
(Continued)

(56) References Cited

U.S. PATENT DOCUMENTS

| 8,714,132 | B2 * | 5/2014 | Baumann | ................ | B04B 5/005 |
| | | | | | 123/196 A |
| 2011/0281712 | A1 * | 11/2011 | Schlamann | ............ | B01D 45/14 |
| | | | | | 494/7 |

FOREIGN PATENT DOCUMENTS

| DE | 4311906 A1 | 10/1994 |
| JP | S43-25141 Y1 | 10/1968 |
| JP | H11-141325 A | 5/1999 |

OTHER PUBLICATIONS

International Search Report with English Translation, ISA/JP, dated Apr. 21, 2016.

(Continued)

*Primary Examiner* — Robert A Hopkins
(74) *Attorney, Agent, or Firm* — Harness, Dickey & Pierce, P.L.C.

(57) ABSTRACT

An oil separator includes a cylindrical housing that accommodates a rotor and is provided with a gas discharge portion (first exhaust portion), the oil separator being configured to introduce target gas from a rotation center side of the rotor to condense oil mist and emit condensed oil from an outer peripheral edge of the rotor and further being configured to discharge from the housing through the gas discharge portion the blow-by gas (target gas) after having the oil mist separated. The oil separator includes a dome portion (sectioning member) that covers from an outside of the housing the gas discharge portion and sections a closed space around the gas discharge portion and an outlet pipe (second exhaust portion) that is provided to the dome portion and that discharges the blow-by gas from the closed space that is sectioned by the dome portion.

4 Claims, 12 Drawing Sheets

(51) Int. Cl.
  *B01D 45/12* (2006.01)
  *B04B 1/08* (2006.01)
  *B04B 7/14* (2006.01)
  *F01M 13/04* (2006.01)

(52) U.S. Cl.
  CPC ............... *B04B 7/14* (2013.01); *F01M 13/04* (2013.01); *B04B 2005/125* (2013.01); *F01M 2013/0422* (2013.01)

(58) Field of Classification Search
  USPC .................................................. 55/400, 404
  See application file for complete search history.

(56) References Cited

OTHER PUBLICATIONS

Form PCT/IB/338 with the English Translation of the International Preliminary Report on Patentability, IB/Geneva, dated Mar. 28, 2017, incorporating the English Translation of the Written Opinion of the ISA, ISA/JP, dated Apr. 21, 2015.
Chinese First Office Action in related application CN 201480082181. 5, SIPO, dated Aug. 3, 2018 with English translation attached.
Japanese Office Action for Japanese Application No. 2016-549845 dated Aug. 29, 2017 (with machine translation).
Extended European Search Report in parallel application EP 14902759. 1, EPO, Munich, dated Apr. 30, 2018.

* cited by examiner

OIL SEPARATOR

TECHNICAL FIELD

The present invention relates to an oil separator that separates oil mist contained in target gas from the gas.

BACKGROUND ART

There has been known an oil separator that separates oil mist contained in target gas from the gas. For example, an oil separator described in PTL 1 includes an accommodating portion that is configured with a cylindrical stationary housing and a cylindrical stationary casing having a ceiling. And a conical partition having an opening on the top surface partitions the interior space of the accommodating portion into a lower chamber (a lower side chamber) and an upper chamber (an upper side chamber).

A centrifugal rotor is disposed in the lower chamber to clean oil. A gas cleaning device is disposed in the upper chamber to clean gas. The lower chamber is in communication with an interior space of the tubular base. This tubular base is mounted to the combustion engine. The cleaned oil is returned through the interior space of the tubular base and the blow-by gas (target gas) from the crankcase flows through this interior space of the tubular base as well.

The centrifugal rotor and the gas cleaning device are coupled together with a pipe-like support member and are configured to be rotatable about the stationary shaft inserted through the support member. A separation chamber is disposed inside the centrifugal rotor. Oil is supplied to the separation chamber through a gap between the support member and the stationary shaft and an aperture opened to the support member. The supplied oil is cleaned in the separation chamber and thereafter discharged sideward through a discharge port provided to the bottom face of the centrifugal rotor. Drive force for rotating the centrifugal rotor and the gas cleaning device is generated by the discharging of oil.

This oil separator has the gas cleaning device rotated at high speed to separate the oil mist contained in the blow-by gas from the gas. The cleaned blow-by gas having the oil mist separated is discharged through the discharge portion provided to the stationary casing.

CITATION LIST

Patent Literature

Patent Literature 1 Japanese translation of PCT International application No. 2005-515065

DISCLOSURE OF THE INVENTION

Problems To Be Solved By The Invention

An oil separator such as that described above has a circulating airflow generated in the interior space along with the rotation of the gas cleaning device. The oil separated by the gas cleaning device moves on the inner surface of the upper chamber with this circulating airflow.

Large displacement combustion engines of vehicles such as trucks have large amounts of target gas flowing with a high flow rate. Hereby, oil separated from the target gas may possibly be taken upward along the inner wall face of the chamber and discharged from the oil separator together with the target gas. When the separated oil is discharged from the oil separator, an issue of a reduced efficiency in removing the oil contained in the target gas would arise.

The present invention has been made under these circumstances, and an object of the present invention is to enhance efficiency in removing the oil mist contained in the target gas.

Summary of Invention

To achieve the above-described object, an oil separator of the present invention includes a cylindrical housing that accommodates a rotor and that is provided with a first exhaust portion, the oil separator being configured to introduce target gas from a rotation center side of the rotor to condense an oil mist contained in the target gas as well as configured to emit condensed oil from an outer peripheral edge of the rotor and further being configured to discharge from the housing through the first exhaust portion the target gas after having the oil mist separated, the oil separator having a sectioning member that covers from an outside of the housing the first exhaust portion and sections a closed space around the first exhaust portion, and a second exhaust portion that is provided to the sectioning member and that discharges the target gas from the closed space that is sectioned by the sectioning member.

According to the present invention, the target gas after having the oil mist separated is discharged from the first exhaust portion to the outside of the housing. This first exhaust portion is covered by a sectioning member from outside the housing. Since this sectioning member is provided with a second exhaust portion, the target gas discharged from the first exhaust portion reduces its flow rate at the closed space formed by the sectioning member and thereafter discharged from the second exhaust portion. This flow rate of the target gas being reduced in the closed space makes the oil separated from the target gas lose its speed thereby allowing the target gas to be restrained from flowing into the second exhaust portion. As a result, the efficiency in removing the oil contained in the target gas can be enhanced.

It is preferable that the aforementioned oil separator has the first exhaust portion configured with a cylindrical member that protrudes out in the closed space. The oil that has been separated from the target gas flows along the outer surface of the first exhaust portion such that the oil flowing into the second exhaust portion can be restrained with this configuration.

It is preferable that the aforementioned oil separator is characterized to have the sectioning member configured in a hemispherical shape, the second exhaust portion in a cylindrical member that has an axis provided at a location away from an axis of the first exhaust portion, and a flow passage control portion provided, in a protruding manner between a location that opposes the first exhaust portion and a location where the second exhaust portion is formed, at an inner surface of the sectioning member. Even when the oil that had been separated from the target gas were to disperse from the inner surface of the first exhaust portion, the oil flowing into the second exhaust portion can be restrained since the direction of the oil flow is controlled by a flow control portion disposed to protrude from the inner surface of the sectioning member, with this configuration. Further, the sectioning member is configured in a hemispherical shape such that the device can be manufactured in a compact size.

It is preferable that the aforementioned oil separator further includes a plurality of ribs that are respectively provided, at the inner surface of the sectioning member, in a protruding manner in a radial direction from a center location of the sectioning member in plan view. Even when the oil that had been separated from the target gas were to disperse from the inner surface of the first exhaust portion, the oil flowing into the second exhaust portion can be restrained since the direction of the oil flow is controlled by a rib disposed to protrude from the inner surface of the sectioning member, with this configuration.

It is preferable that the aforementioned oil separator has the first exhaust portion configure a downstream side flow passage of a PCV valve. The configuration can be simplified since the downstream side flow passage of the PCV valve also serves as the first exhaust portion with this configuration.

It is preferable that the aforementioned oil separator further includes a spindle that serves as a rotation center of the rotor, a spindle shaft that rotatably supports the spindle and has formed on an inner side an oil supply passage that is configured to supply an oil, a nozzle that is provided to the spindle in a protruding manner from a circumferential face that is on a lower side of the rotor and that rotates the spindle about an axis by injecting the oil, and a communication port forming member that is disposed between the spindle shaft and the nozzle, sections an interior space of the housing into a primary separation chamber that makes oil ejected from the nozzle to flow downward and primarily separates the oil mist contained in the target gas that has flown in from an outside and a secondary separation chamber that has the rotor disposed and secondarily separates the oil mist contained in the target gas having the oil mist primarily separated, and forms a communication portion that guides the target gas in the primary separation chamber to the secondary separation chamber as well. Oil mist contained in the target gas after being primarily separated in the primarily separation chamber is secondarily separated in the secondary separation chamber so that problems of the oil being discharged from the secondary discharge portion can be restrained, with this configuration.

Advantageous Effects of Invention

According to the present invention, efficiency in removing oil contained in target gas can be enhanced.

DETAILED DESCRIPTION

The following describes embodiments of the present invention with reference to the drawings. The following is a description giving a closed crankcase ventilation system 1 (hereinafter referred to as a ventilation system 1) illustrated in FIG. 1 as an example.

Figure 1:
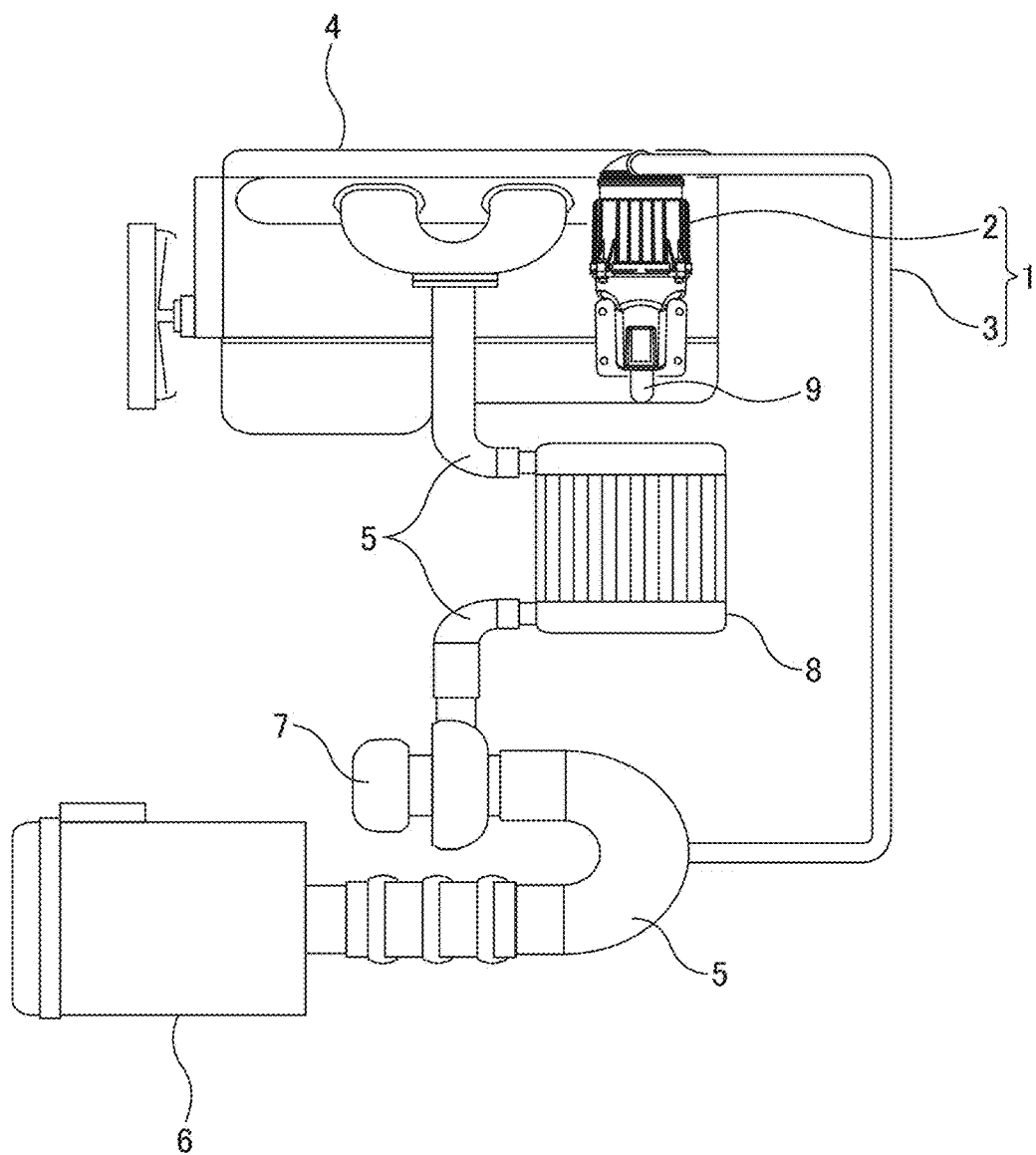
FIG. 1 is a schematic diagram illustrating a closed crankcase ventilation system.

As illustrated in FIG. 1, the ventilation system 1 includes an oil separator 2 and a breather pipe 3. The oil separator 2 treats blow-by gas (equivalent to target gas containing oil mist) discharged from an engine 4 to separate the oil mist. This embodiment includes the oil separator 2 at a side face of the engine 4. This engine 4 has, for example, substantially 5000 to 12000 cc displacement. The breather pipe 3 constitutes a return flow passage, through which the treated blow-by gas discharged from the oil separator 2 returns to an intake-side flow passage 5 of the engine 4.

In this ventilation system 1, the blow-by gas discharged from the engine 4 flows into the oil separator 2, which is disposed at the side face of the engine 4. The oil separated by the oil separator 2 is returned to the engine 4. Meanwhile, the treated blow-by gas is discharged from an upper end portion of the oil separator 2 and then returned to the intake-side flow passage 5 through the breather pipe 3. Specifically, the treated blow-by gas is returned to a part where an air filter 6 is coupled to a turbocharger 7 in the intake-side flow passage 5. The returned blow-by gas is mixed with fresh air from the air filter 6 and compressed by the turbocharger 7. Afterwards, the blow-by gas is cooled by a charge cooler 8 and supplied to the engine 4.

Figure 2:
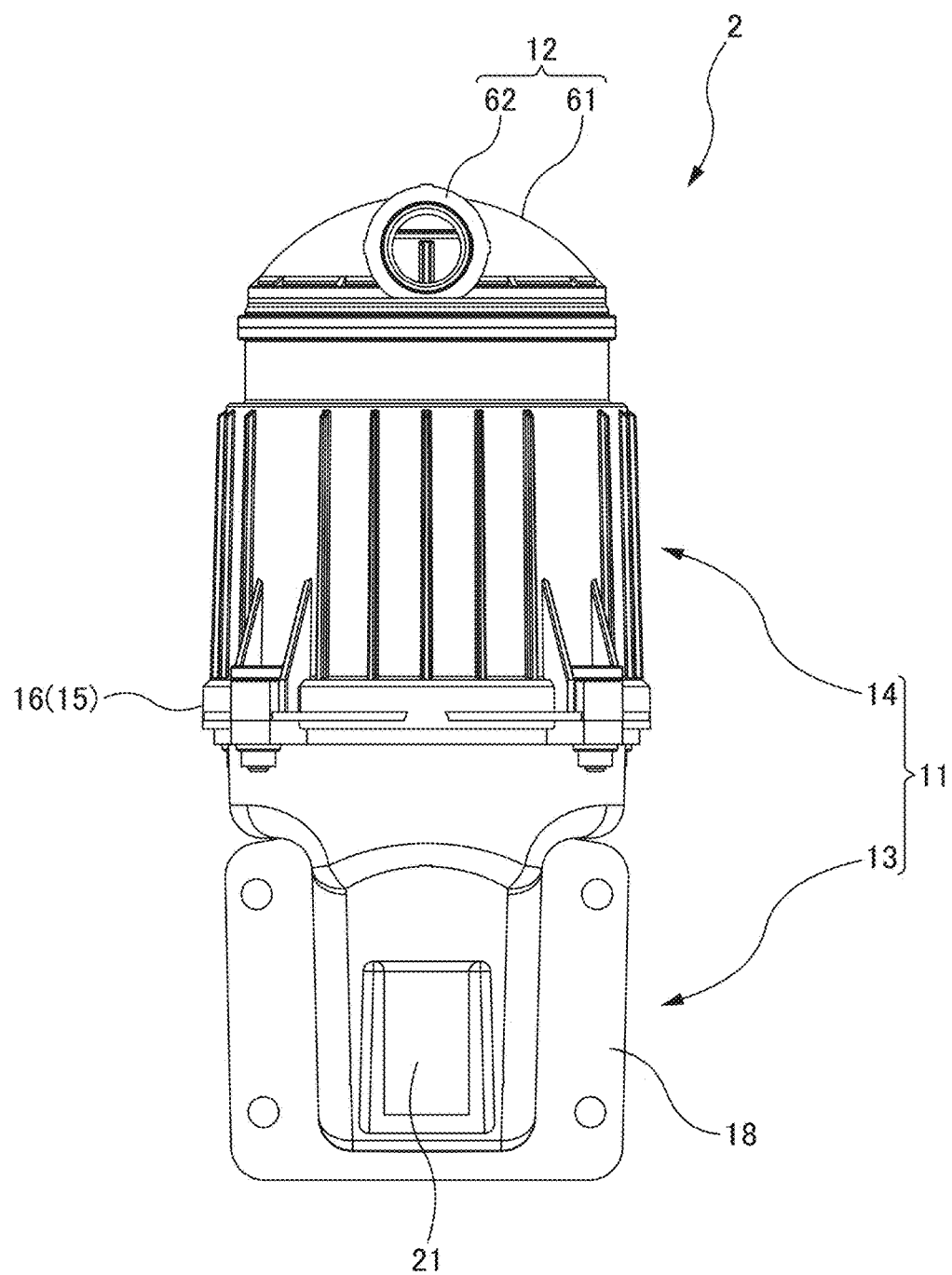
FIG. 2 is a front view of an oil separator.

The following describes the oil separator 2. As illustrated in FIG. 2, this oil separator 2 includes a housing 11 and a cap member 12.

Firstly, description of the external appearance of the housing 11 will be given. The housing 11 includes a lower case 13 and an upper case 14, and an interior space (chamber) thereof houses various components such as a rotor unit and a PCV valve, as to be described in detail later.

Figure 3:
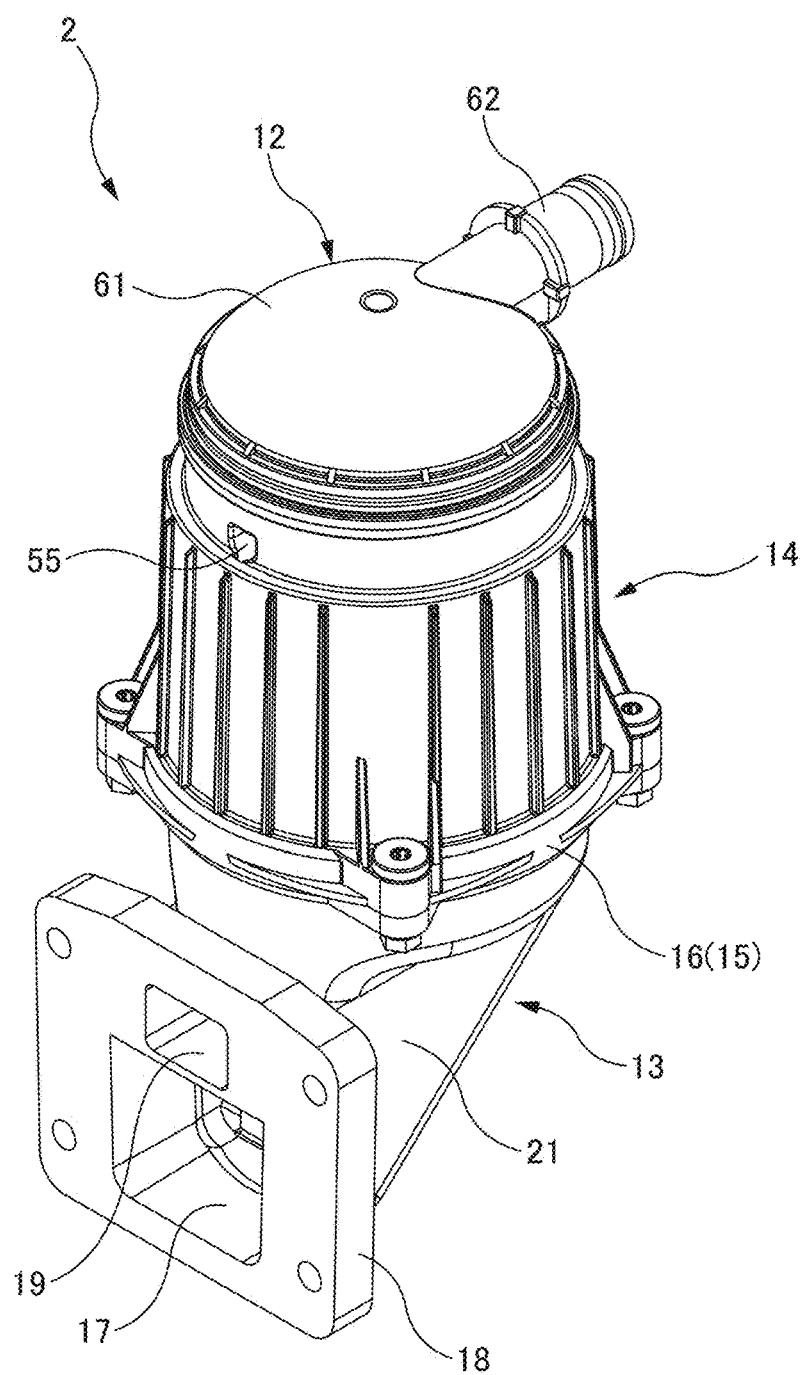
FIG. 3 is a perspective view of a rear of the oil separator as viewed from obliquely above.

The lower case 13 is a part that sections a lower side part of the housing 11 and the upper case 14 is a part that sections the upper part of the housing 11. As illustrated in FIG. 3, a circular fitting portion 15 is disposed to the upper part of the lower case 13 and fits to a lower end portion 16 of the upper case 14. A communication tube portion 17 is disposed facing backward on the back surface of the lower case 13, and the communication tube portion 17 communicates with the engine 4. A flange 18, which couples to the side face of the engine 4, is disposed at the distal end portion of this communication tube portion 17. A guide tube portion 19 for guiding blow-by gas is disposed directly above the communication tube portion 17. And a middle portion 21 that is substantially triangular when viewed from the side face and that sections a part of the oil flow passage, is disposed between the fitting portion 15 and the communication tube portion 17 as well as the guide tube portion 19.

Figure 9:
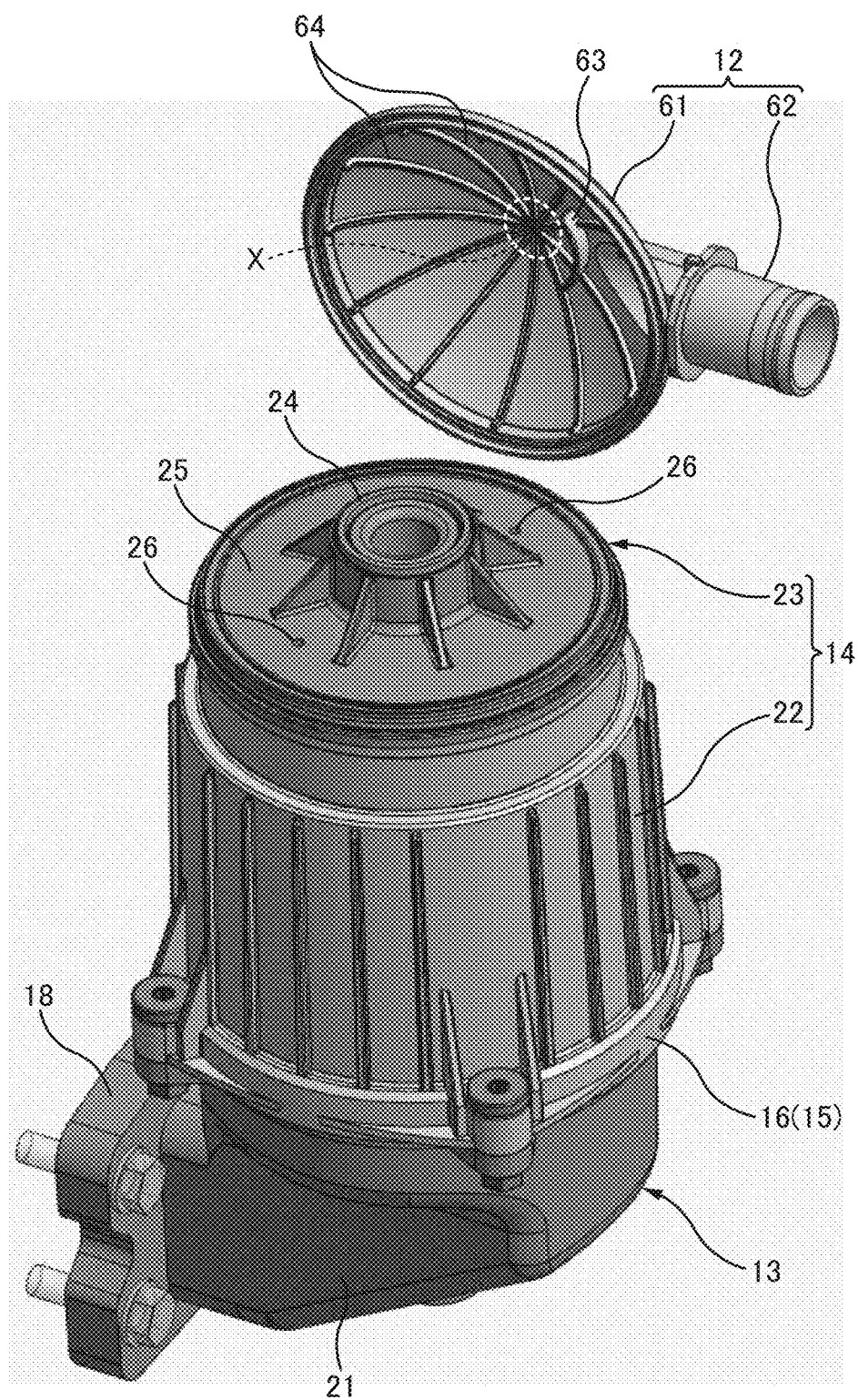
FIG. 9 is a perspective view illustrating the cap member removed from the housing.

As illustrated in FIG. 9, the upper case 14 includes a body cover 22 and a top surface cover 23. The body cover 22 is a substantially cylindrical member and houses a rotor unit therein. A pedestal for the PCV valve is disposed on the top face of the body cover 22, as to be described later. The top surface cover 23 is hermetically mounted in a manner covering from above the top face of the body cover 22. Hereby, the PCV valve mounted on the pedestal is housed in a space sectioned by the top surface cover 23 and the body cover 22. Further, a cylindrical gas discharge portion 24 is provided and oriented to protrude upward at a center of the top surface cover 23. This gas discharge portion 24 corresponds to the first exhaust portion and is a cylindrical part from which the treated blow-by gas is discharged. Further, the gas discharge portion 24 also serves as the downstream side flow passage of the PCV valve. Two drain holes 26 are formed on a disk-like plate portion 25 that is located on the outer circumferential side with respect to the gas discharge portion 24 on the top surface cover 23 has formed. These drain holes 26 are provided for allowing oil that had reached the surface of the top surface cover 23 to flow down into the space sectioned by the top surface cover 23 and the body cover 22.

Figure 4:
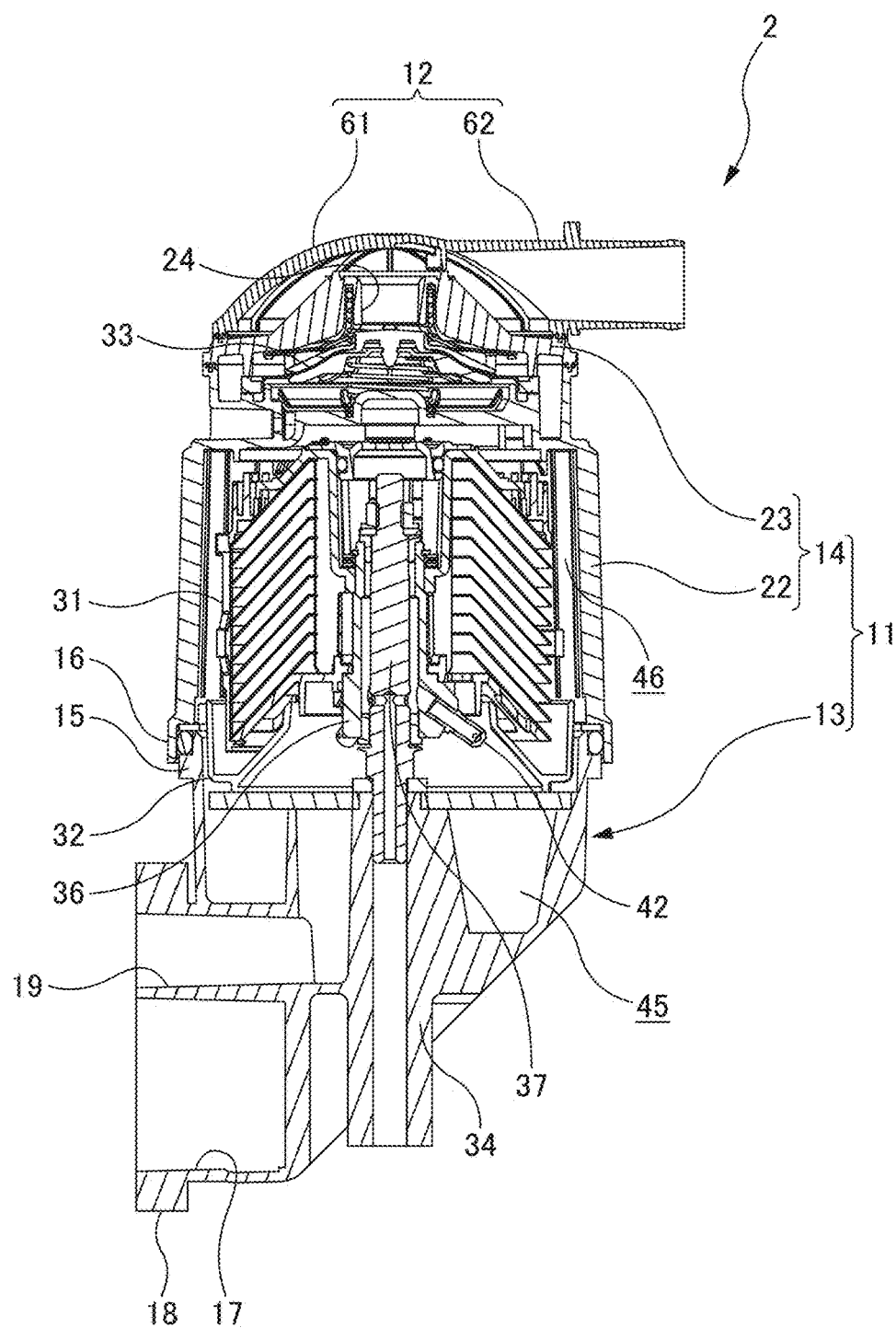
FIG. 4 is a cross-sectional view of the oil separator.

The following describes the interior structure of the housing 11. As illustrated in FIG. 4, a rotor unit 31 and a communication port forming member 32 are positioned inside the housing 11. Further, the space sectioned by the top surface cover 23 and the body cover 22 houses therein the PCV valve 33.

Firstly, description of the interior structure of the lower case 13 will be given. As illustrated enlarged in FIG. 5, the bottom face of the lower case 13 has a lower end portion of the joint 34 oriented and disposed to protrude downward. This joint 34 is cylindrical and is coupled to one end of the oil supply pipe 9 illustrated in FIG. 1. A portion of the joint 34 is disposed to protrude upward at the interior of the lower case 13. The other end of the oil supply pipe 9 is connected to the side face of the engine 4 and oil from the oil passage (not shown) that is provided inside the engine 4 is supplied to the oil supply pipe 9. This oil is used as the power for rotating the rotor unit 31.

Figure 5:
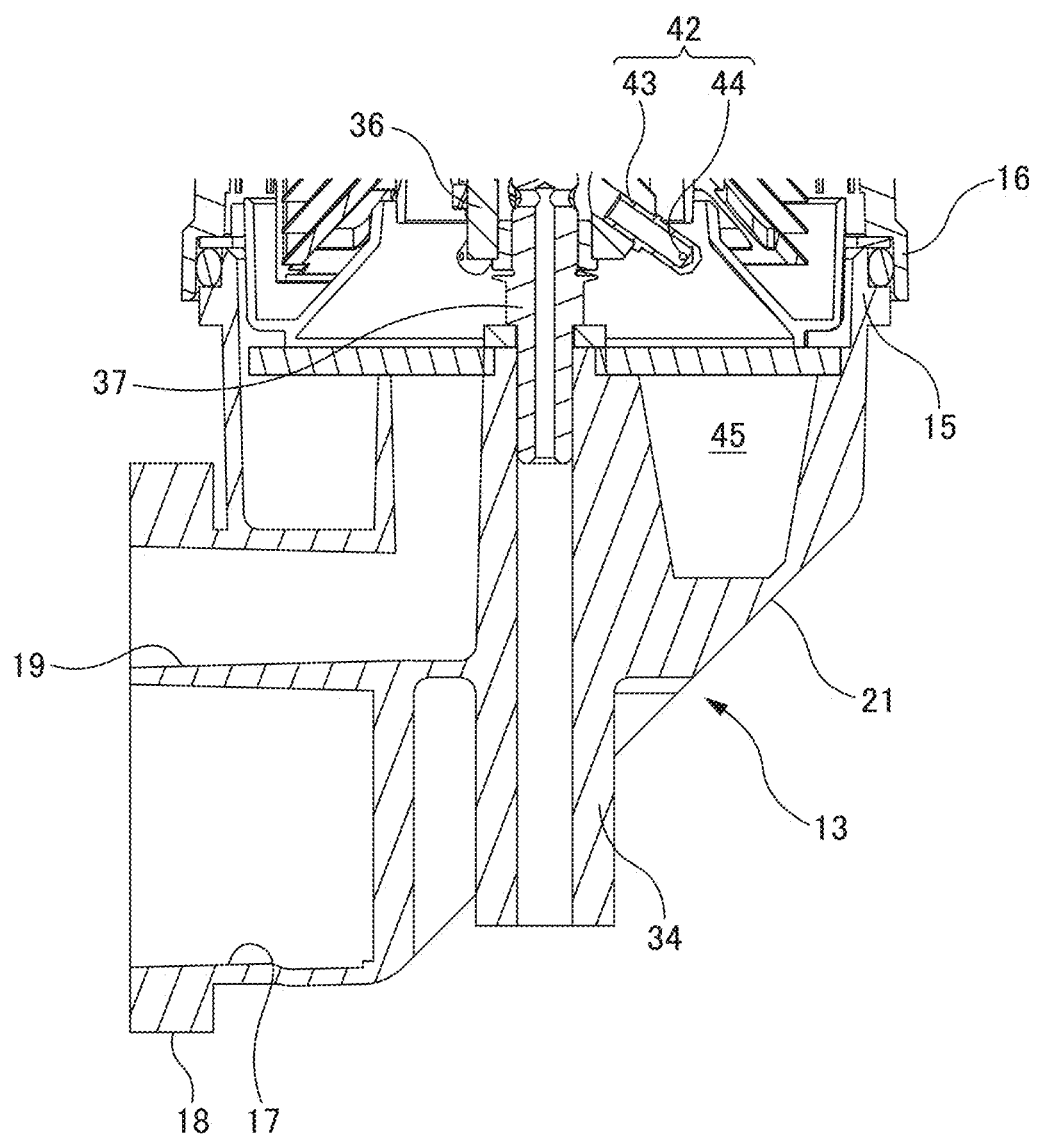
FIG. 5 is a cross-sectional view of a lower part of the oil separator.

As illustrated in FIG. 5, a sequence of oil flow passages that starts from the communication tube portion 17, through the middle portion 21 and leading to the fitting portion 15 is formed inside the lower case 13. These oil flow passages are used as flow passages for returning oil to the engine 4. And a part of the guide tube portion 19 is provided along the joint 34. This guide tube portion 19 is bent at the middle thereof into an L-shape and the remaining parts are provided parallel to the communication tube portion 17. This guide tube portion 19 is disposed directly above the communication tube portion 17 and an end portion thereof is aligned with the face of the flange 18 that comes into contact with the engine 4.

Figure 6:
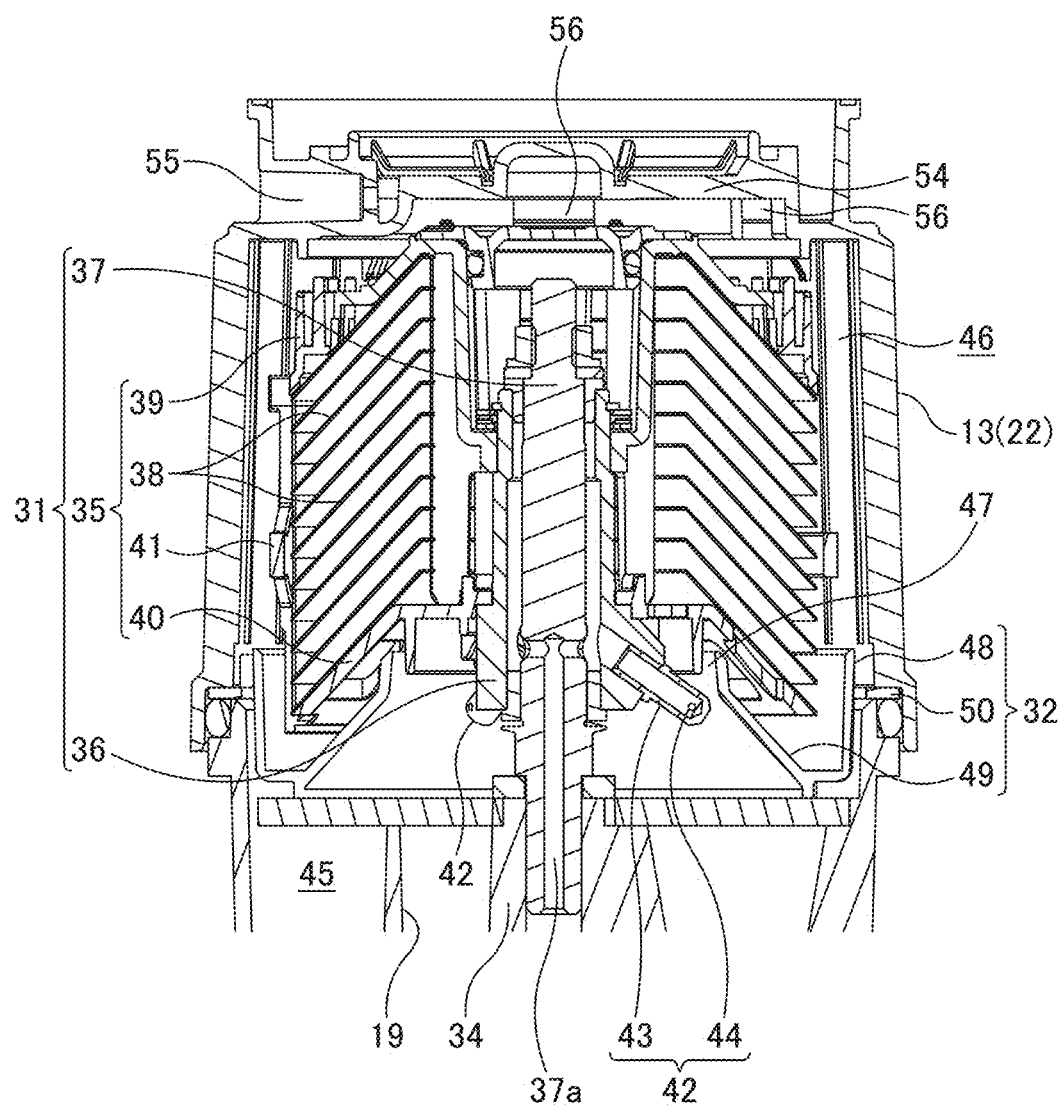
FIG. 6 is a cross-sectional view of a middle part of the oil separator.

Subsequently, the following describes the interior structure of the upper case 14. As illustrated in FIG. 6, the rotor unit 31 and the communication port forming member 32 are disposed inside the body cover 22 of the upper case 14 has disposed therein.

First, the following describes the rotor unit 31. This rotor unit 31 is a mechanism for separating the oil mist contained in the blow-by gas. The rotor unit 31 includes a rotor 35, a spindle 36, and a spindle shaft 37.

The rotor 35 is a part that condenses the oil mist by rotation and separates the oil mist from the blow-by gas. The rotor 35 includes a plurality of separation disks 38, an upper holder 39, and a lower holder 40. The separation disks 38 are plate materials that are formed to have the annular plate materials incline downward toward to the outer peripheral side, that is, to have the side faces of the plate members formed in a truncated cone shape. The separation disks 38 of the present embodiment have a thickness not greater than 1 mm and are made by molding resin. These separation disks 38 are layered in the axis direction of the spindle 36.

For the convenience of explanation, the separation disks 38 are illustrated to be provided with intervals between one another, however, the actual intervals are defined to be extremely narrow (e.g., less than 1 mm.) Further, the shape formed by the separation disks 38 is not limited to a truncated cone shape. For example, the separation disks 38 may be made of plate members having a truncated pyramid shape such as an octagonal pyramid shape and a dodecagonal pyramid shape.

The upper holder 39 is a member that holds the plurality of layered separation disks 38 from above. Similarly, the lower holder 40 is a member that holds the separation disks 38 from below. In the outer peripheral edge of the lower holder 40, a plurality of coupling arms 41 for coupling to the upper holder 39 are disposed. In this embodiment, the four coupling arms 41 are provided circumferentially at intervals of 90 degrees. The upper ends of the coupling arms 41 being joined to the upper holder 39, the plurality of separation disks 38, the upper holder 39, and the lower holder 40 are integrated to constitute the rotor 35.

This rotor 35 has a cylindrical outer appearance. On the inner peripheral side of the rotor 35, there is a hollow part vertically extends through. The spindle 36 is inserted into this hollow part of the rotor 35, and the spindle 36 and the rotor 35 are coupled to one another. Accordingly, the rotor 35 rotates, together with the spindle 36, about the axis of the spindle 36.

Nozzles 42 project from sections of a peripheral surface of the spindle 36 and the sections are located below with respect to the rotor 35. Each of the nozzles 42 is a part from which the oil supplied through the spindle shaft 37 is injected to generate a driving power to rotate the spindle 36 and the rotor 35.

The nozzles 42 of this embodiment include cylindrical nozzle bodies 43 and injection holes 44. The cylindrical nozzle bodies 43 have the base ends joined to the spindle 36 and the distal ends covered. The injection holes 44 are provided at distal end portions of the nozzle bodies 43. The nozzle bodies 43 are mounted to be directed obliquely downward at an angle of 45 degrees with respect to the axial direction of the spindle 36. The three nozzle bodies 43 are circumferentially disposed at intervals of 120 degrees. The injection hole 44 is disposed on a side surface at the distal end portion of the respective nozzle body 43. More specifically, the injection hole 44 is disposed in a direction such that the oil is injected horizontally.

The spindle shaft 37 is a pillar member serving as a bearing of the spindle 36, and supports the spindle 36 in a rotatable manner. An oil supply passage 37a is formed inside the spindle shaft 37 to supply the oil. A lower end portion of the spindle shaft 37 is joined to an upper end portion of the joint 34 which is disposed in the lower case 13. The oil supply pipe 9 is connected to this joint 34 as mentioned above. Accordingly, the oil supplied through the oil supply pipe 9 passes through the joint 34, and then flows into the oil supply passage 37a of the spindle shaft 37. Thereafter, the oil flows into the nozzle bodies 43, and then the oil is injected from the injection holes 44.

As described above, the injection hole 44 is disposed at the distal end portion of the nozzle body 43 in a direction such that the oil is injected substantially horizontally. At the three nozzles 42 which are disposed at intervals of 120 degrees, the positions where the injection holes 44 are formed are aligned. Accordingly, when the oil is injected from the respective injection holes 44, the rotor 35 and the spindle 36 rotate about the spindle shaft 37 that serves as the axis.

The following describes the communication port forming member 32. The communication port forming member 32 is a member that partitions the interior space (the chamber) of the housing 11 into a lower chamber 45 (a primary separation chamber) and an upper chamber 46 (a secondary separation chamber). The communication port forming member 32 is also a member that forms a communication port 47 that guides the blow-by gas in the lower chamber 45 to the upper chamber 46. The communication port forming member 32 has an outer peripheral portion 48 and a tapered portion 49. The outer peripheral portion 48 is a short cylindrical part and has a collar portion at the middle in the height direction. This collar portion projects outwardly. The tapered portion 49 is disposed on the inner peripheral side with respect to the outer peripheral portion 48, and has a tapered shape in which the diameter is gradually reduced from the lower end of the outer peripheral portion 48 toward above. The tapered portion 49 of this embodiment has an inclined surface that inclines at an angle of approximately 45 degrees with respect to the axis of the spindle 36. An upper end opening of the tapered portion 49 forms the communication port 47.

The communication port forming member 32 is fit to the inner peripheral side of the fitted portion 15 in the lower case 13. The collar portion 50 abuts on an upper end of the fitted portion 15 from above to be positioned. Consequently, the tapered portion 49 is disposed immediately below the lower holder 40 included in the rotor 35. The chamber is partitioned into the lower chamber 45 and the upper chamber 46, which are bordered by the communication port forming member 32. The lower chamber 45 and upper chamber 46 communicate through the communication port 47. In other words, the communication port 47 that guides the blow-by gas of the lower chamber 45 to the upper chamber 46 is formed around the spindle 36 at a height between the nozzles 42 and the separation disks 38, with this communication port forming member 32.

Figure 7:
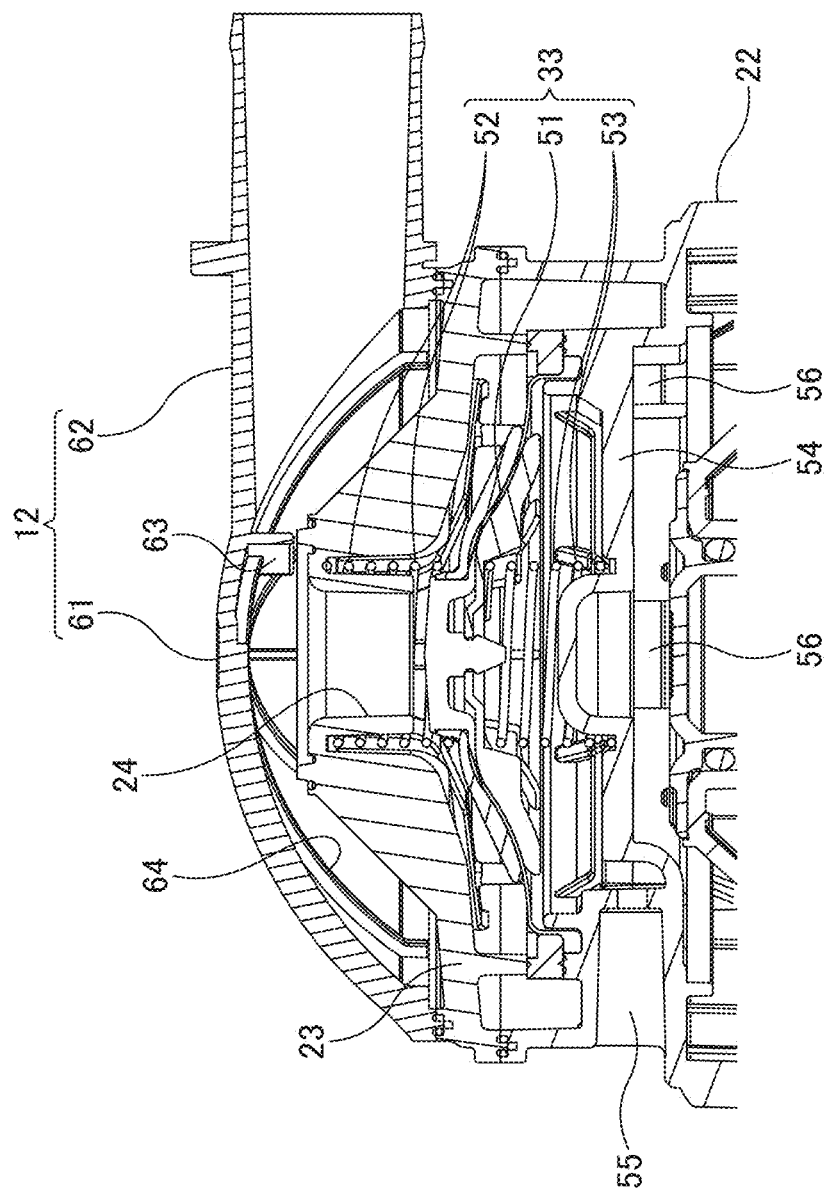
FIG. 7 is a cross-sectional view of an upper part of the oil separator.

Next, description of the PCV valve 33 and the peripheral parts thereof will be given. As illustrated in FIG. 7, the PCV valve 33 is disposed in the space formed with the upper end portion of the body cover 22 and the top surface cover 23. This PCV valve 33 includes a diaphragm 51, an upper spring 52 and a lower spring 53.

The diaphragm 51 is a valve body that is made by forming rubber and resin, and the diaphragm 51 is configured with a disk-like member that is inclined slightly downward from the center portion toward the peripheral edge. The upper spring 52 and the lower spring 53 are members for supporting the diaphragm 51 in a vertically movable manner. In other words, the upper spring 51 is disposed from above the center of the diaphragm 51 and the lower spring 53 is disposed from below the center of the diaphragm 51. The upper and lower springs 52, 53 sandwiching the diaphragm 51 supports the diaphragm 51 in a vertically movable manner.

This PCV valve 33 is disposed at a location directly below the top surface cover 23 in a state mounted on the pedestal 54. The pedestal 54 is hermetically covered by the diaphragm 51. The space sectioned by the pedestal 54 and the diaphragm 51 is opened to the atmosphere through the atmosphere communication portion 55. Meanwhile, the space formed between the top surface cover 23 and the diaphragm 51 is in communication with the upper chamber 46. In other words, the outer periphery of the pedestal 54 is sectioned by a side wall portion that is circular in plan view and this side wall portion is provided with a communication window 56. This communication window 56 communicates the upper chamber 46 with the space formed between the top surface cover 23 and the diaphragm 51.

The diaphragm 51 moves in the vertical direction in response to the suction side pressure of the engine 4 and the inner pressure of the crankcase to adjust the flow of the blow-by gas. In other words, the diaphragm 51 moves toward the gas discharge portion 24 side (upward) when the suction pressure (negative pressure) of the engine 4 is excessively large and moves to the opposite side (downward) when the pressure on the crankcase side is high.

Hereby, the diaphragm 51 moves downward to increase the blow-by gas flow rate when the upper chamber 46 pressure is higher than the PCV set pressure. On the other hand, the diaphragm 51 moves upward to reduce the blow-by gas flow rate when the upper chamber 46 pressure is lower than the PCV set pressure. In this way, the crankcase side pressure of the engine 4 is maintained in a predetermined range by appropriately adjusting the blow-by gas flow rate. Here, the blow-by gas that had flown in from the upper chamber 46 flows through the PCV valve 33 to be discharged out of the housing 11 through the gas discharge portion 24.

Figure 8:
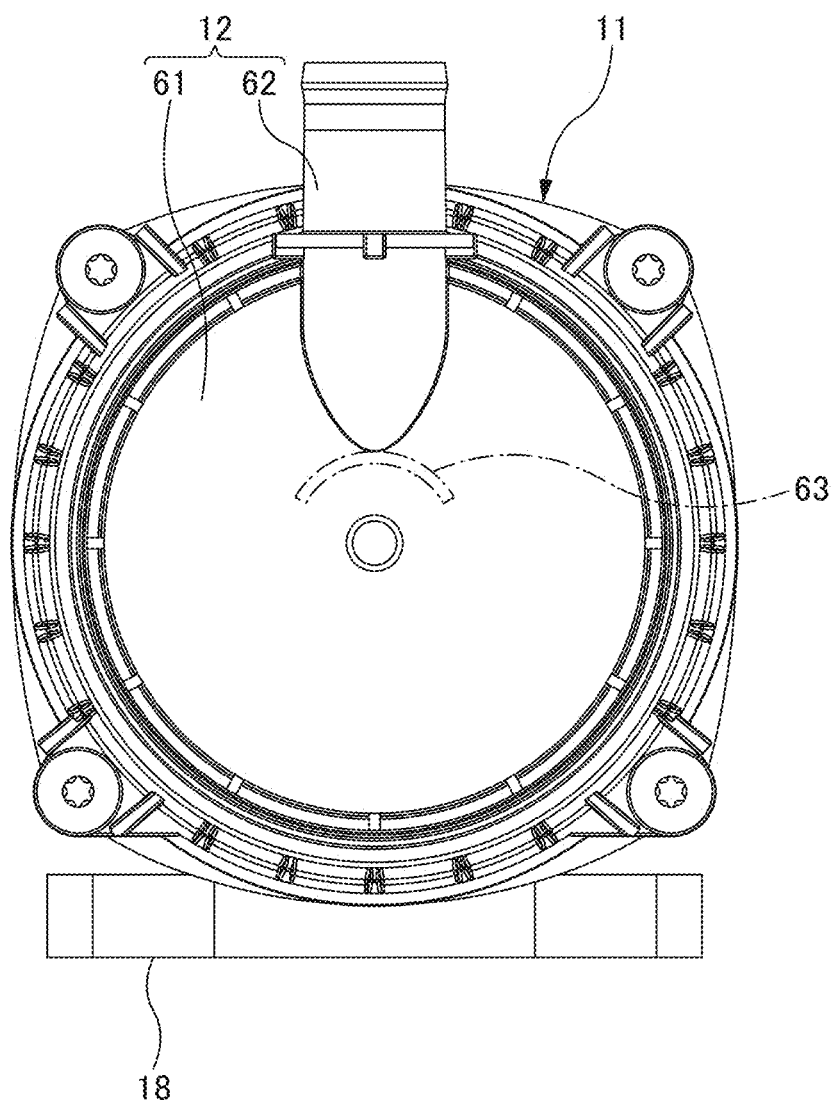
FIG. 8 is a plan view of the oil separator.

The following describes the cap member 12. This cap member 12 includes a hemispherical dome portion 61 and a cylindrical outlet pipe 62 that protrudes sideward (radius direction of the housing 11) from the dome portion 61, as illustrated in FIGS. 7 and 8. The dome portion 61 corresponds to the sectioning member that covers the gas discharge portion 24 (first exhaust portion) from outside the housing 11 to section a closed space around the gas discharge portion 24. The use of the hemispherical dome portion 61 allows keeping the height of the cap member 12 low so that the oil separator 2 can be made in a compact size. The outlet pipe 62 corresponds to the second exhaust portion and discharges the blow-by gas from the closed space sectioned by the dome portion 61. The breather pipe 3 is connected to this outlet pipe 62. Hereby, the blow-by gas discharged from the outlet pipe 62 flows through the breather pipe 3 to be returned to the suction side of the engine 4.

The gas discharge portion 24 protrudes into the closed space sectioned by the dome portion 61 as illustrated in FIG. 7. A flow passage control piece 63 protrudes downward at the inner surface of the dome 61 between the location (range indicated with a reference sign X in FIG. 9) opposing the gas discharge portion 24 and the location where the outlet pipe 62 is formed. This flow passage control piece 63 corresponds to the passage control portion that is a plate member for controlling the flow direction of the blow-by gas that has been discharged from the gas discharge portion 24. The flow direction of a part of the blow-by gas is changed downward with this flow passage control piece 63.

Further, a plurality of guide ribs 64 are provided to project from the inner surface of the dome portion 61 as illustrated in FIG. 9. The respective guide ribs 64 extend in the radial direction from the center of the dome portion 61 in plan view. The 11 guide ribs 64 of the present embodiment are formed at intervals of 30 degrees. The outlet pipe 62 is provided to the location in the 60 degree space formed between adjacent guide ribs 64. Note that, the flow passage control piece 63 is disposed to intersect a pair of guide ribs 64 that sandwich the outlet pipe 62.

Figure 10:
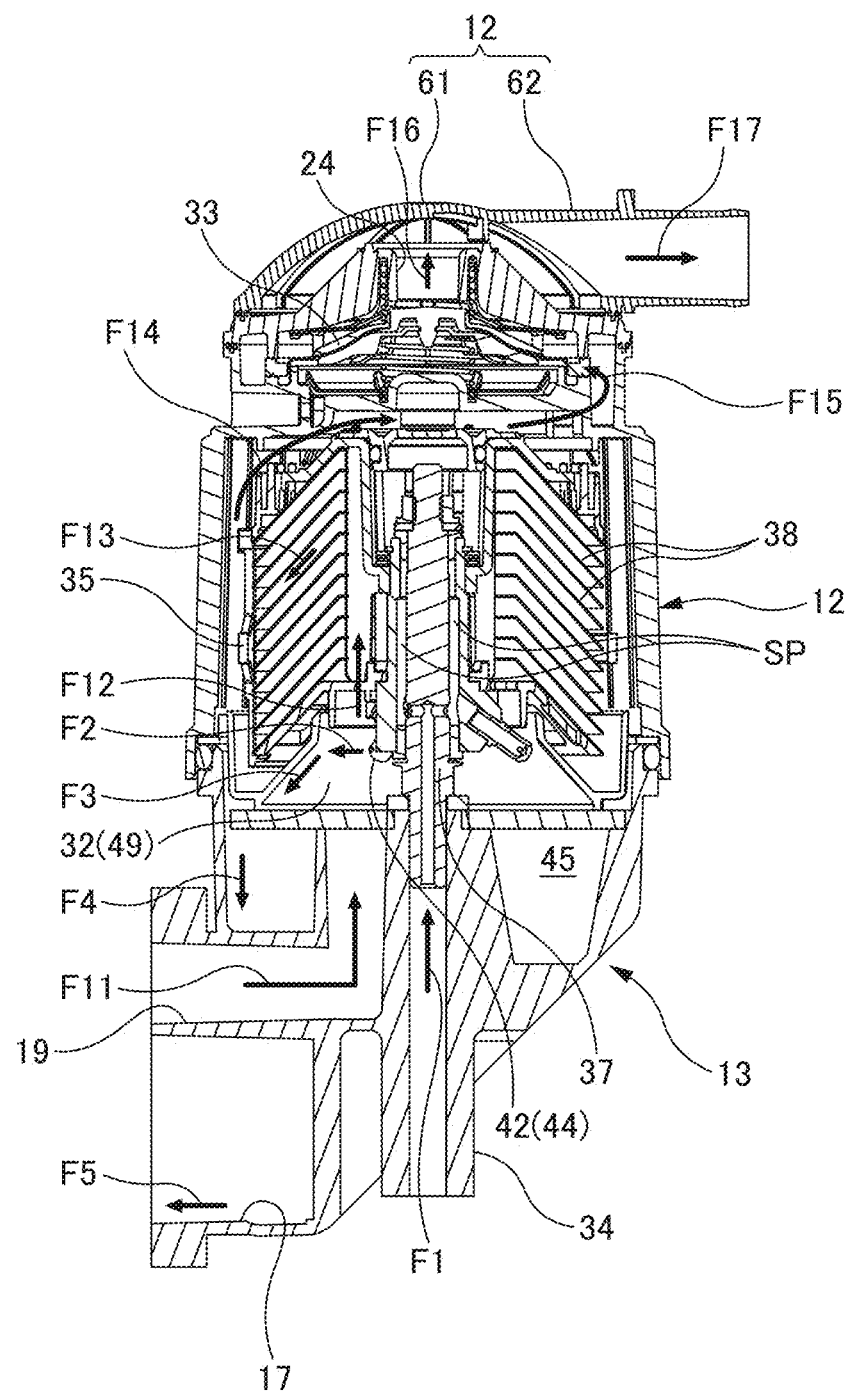
FIG. 10 is a view illustrating flows of blow-by gas and oil.
Figure 11:
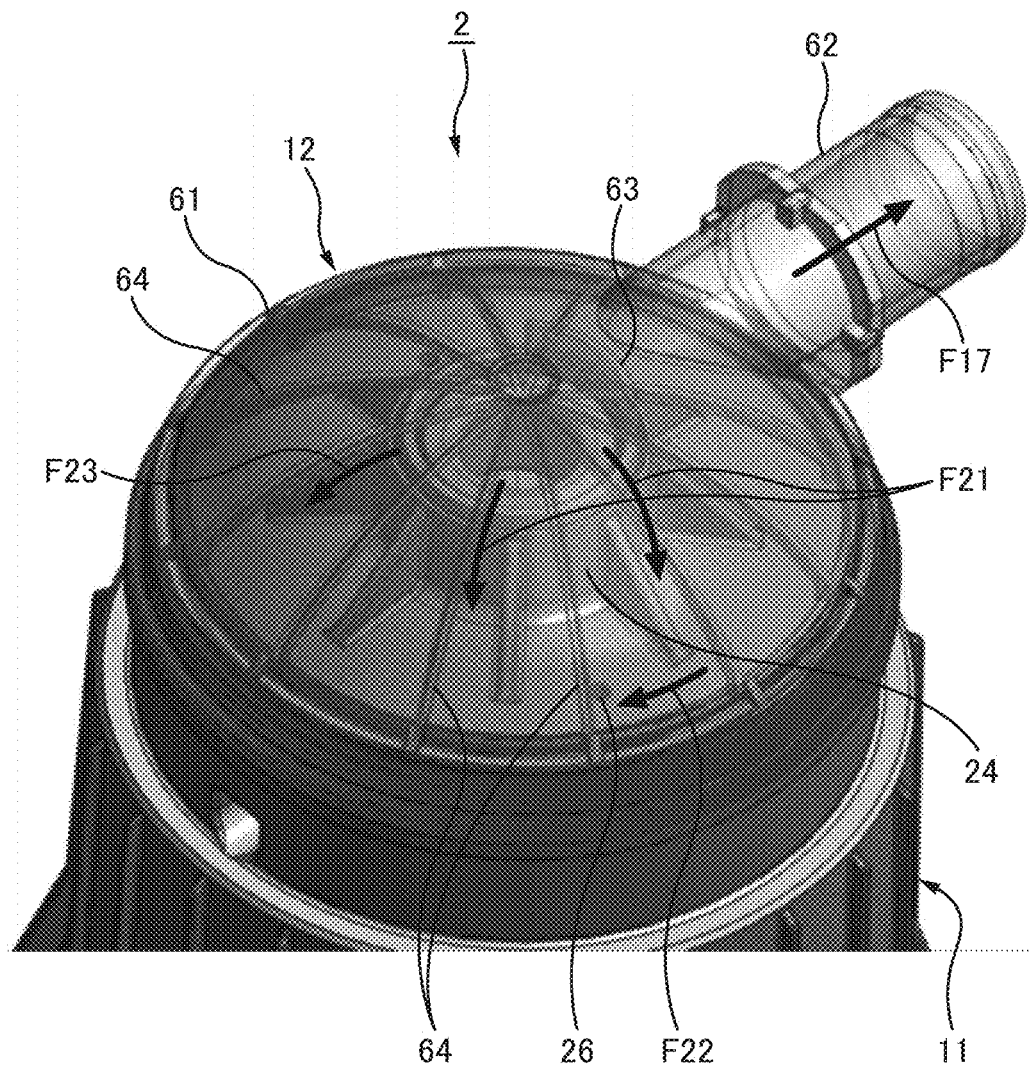
FIG. 11 is a transparent view illustrating flows of blow-by gas and oil in the cap member.

The following describes the separation of the oil mist from the blow-by gas, in the separator 2 with reference to FIGS. 10 and 11.

Firstly, with reference to FIG. 10, the oil that had been supplied from the engine 4, through the oil supply pipe 9 and to the joint 34 flows through the joint 34 and into the spindle shaft 37, as indicated with the arrow attached with a reference sign F1. Then, the oil flows from the spindle shaft 37 and into the nozzle body 43 and thereafter the oil is injected from the injection holes 44 of the nozzles 42, as indicated with the arrow attached with a reference sign F2. When the oil is injected from the injection holes 44, the rotor 35 and the spindle 36 rotate about the spindle shaft 37.

The injected oil is blown against the tapered portion 49 of the communication port forming member 32 and then guided obliquely downward toward the outer peripheral side along the inclined surface of the tapered portion 49, as indicated with the arrow attached with a reference sign F3. Hereby, the splattered oil mixing into the blow-by gas can be restrained. Further, oil film, which is turning at high speed, is formed on the outer peripheral side with respect to the turning paths of the injection holes 44. When the blow-by gas contacts this oil film, the oil mist contained in the blow-by gas is taken into the oil film and separated by centrifugation. Hereby, the oil mist content in the blow-by gas is reduced.

Thus, in the lower chamber 45, the oil mist content in the blow-by gas can be reduced by the injection of the oil, which functions as the driving source for the spindle 36 and the rotor 35. Therefore, the lower chamber 45 functions as the primary separation chamber for the oil mist.

Afterwards, as indicated by the arrow attached with a reference symbol F4, the oil flows down on the inner surface of the lower case 13 to the bottom of the lower chamber 45. And, as indicated by an arrow with a reference symbol F5, the oil flows into the communication tube portion 17 and is returned to the crankcase from the side face of the engine 4.

A clearance SP is formed between the spindle 36 and the spindle shaft 37. This clearance SP serves as an oil guiding passage and is filled with the supplied oil to be injected from the nozzles 42. Since the oil supply pressure is sufficiently high, a part of the oil that had filled the clearance SP passes through the upper end of the clearance SP to be emitted from the upper end portion of the spindle 36 to the hollow part of the rotor 35.

Due to the centrifugal force of the rotor 35, the oil emitted to the hollow part of the rotor 35 moves through the gaps between the separation disks 38 in the outer peripheral direction of the rotor 35. Oil films are formed to the surfaces of the separation disks 38 by the moving of the oil.

The blow-by gas from the engine 4 is guided by the guide tube portion 19 as indicated by the arrow attached with a reference symbol F11. Thereafter, the blow-by gas that had been discharged from the guide tube portion 19 flows through the inner side of the path made by the movement of the injection holes 44 to flow into the hollow part of the rotor 35 as indicated by the arrow attached with a reference symbol F12. The blow-by gas that had flown into the hollow part of the rotor 35 then moves through the gaps created between the separation disks 38 toward the direction of the outer periphery of the rotor 35, as indicated by the arrow attached with a reference symbol F13, by the centrifugal force generated by the rotation of the rotor 35.

When the oil mist contained in the blow-by gas reaches a location (boundary layer) proximate the oil film, the oil mist is taken into the oil film by the centrifugal force since the oil films are formed on the surface of the separation disks 38. In other words, secondary separation of oil takes place. The oil mist and the oil film have a high compatibility since both of them originates from the same engine oil. The high compatibility of the two allows them to easily take the oil mist contained in the blow-by gas into the oil film. Further, the blow-by gas had the oil mist primarily separated in the lower chamber 45. Therefore, oil mist is separated from the blow-by gas at a high level with the secondary separation at the separation disks 38. In this way, the upper chamber 46 corresponds to a secondary separation chamber that secondarily separates the remaining oil mist from the blow-by gas that had the oil mist primarily separated.

When the blow-by gas moves toward the direction of the outer periphery of the rotor 35 by the centrifugal force, the pressure on the inner circumferential side of the rotor 35 becomes lower than the pressure on the outer peripheral side. This pressure difference makes it easy for the blow-by gas in the lower chamber 45 to flow into the hollow part of the rotor 35. Hereby, the efficiency of the blow-by gas to flow in can be increased.

Oil films are formed on the surfaces of the separation disks 38 so that the oil films moves together with the blow-by gas toward the outer peripheral side of the rotor 35. Since the surfaces of the separation disks 38 are cleaned with this performance, the maintenance for the separation disks 38 can be simplified. And the oil films that had taken in the oil mist are emitted as oil drops from the outer peripheral edges of the separation disks 38, hit against the inner surface of the body cover 22, and then flow down along this inner surface. This oil joins the oil injected from the nozzles 42 in the lower chamber 45 to be returned to the engine 4.

The blow-by gas, which had passed through the rotor 35 and from which the oil mist had been separated, moves upward while circulating. The blow-by gas is guided to the space on the top surface side of the PCV valve 33, as indicated by arrows with reference symbols F14 and F15. Then, as indicated by an arrow with a reference symbol F16, the blow-by gas passes through the gas discharge portion 24 (first exhaust portion, downstream side flow passage of the PCV valve 33) to be emitted into the closed space partitioned by the dome portion 61. In other words, the blow-by gas is discharged outside the housing 11. Thereafter, the blow-by gas flows through the outlet pipe 62 to be introduced into the breather pipe 3 as indicated by the arrow attached with a reference symbol F17.

Here, the blow-by gas of the engine 4 having a large displacement has a high flow volume and also a high flow rate. Therefore, a part of the separated oil may circle and ascend along the inner wall face of the body cover 22. The ascended oil would flow along such as the top face of the PCV valve 33 and the inner wall face of the top surface cover 23 to further ascend the inner surface of the gas discharge portion 24.

As illustrated in FIG. 11, a cylindrical gas discharge portion 24 is disposed in the closed space sectioned by the dome portion 61 of the cap member 12 in the present embodiment. The cross-sectional area of the flow passage of this closed space is greater than the sectional area of the flow passage of the gas discharge portion 24. Therefore, the flow rate of the blow-by gas declines by being discharged to the closed space. Along with such, the oil loses its speed at the upper end of the gas discharge portion 24 even if the blow-by gas were to ascend along the inner surface of the gas discharge portion 24. The oil that had lost its speed flows down the outer surface of the gas discharge portion 24 with its own weight and thereafter flows through the drain hole 26 formed to the top surface cover 23, as indicated by the arrows attached with reference symbols F21 and F22, and then down into the space sectioned by the top surface cover 23 and the body cover 22. The oil that had flown into this space flows down the blow-by gas flow passage and is ultimately returned to the engine 4.

Even when the oil had splattered upward from the upper end of the gas discharge portion 24 with the flow of the blow-by gas and was to stick onto the inner surface (part opposing the gas discharge portion 24) of the dome portion 61, the oil that was stuck will flow along the guide ribs 64, as indicated by the arrow attached with a reference symbol F23, so that oil is unlikely to flow into the outlet pipe 62. Further, the direction of the oil flowing down toward the outlet pipe 62 can be changed with the flow passage control piece 63. For also such reason, the oil that was stuck is unlikely to flow into the outlet pipe 62. As a result, blow-by gas including a small flow amount of oil is discharged from the outlet pipe 62 to be guided to the breather pipe 3.

As described above, the blow-by gas (target gas) that had the oil mist separated is discharged outside the housing 11 from the gas discharge portion 24 (first exhaust portion) according to the oil separator 2 of the present embodiment. This gas discharge portion 24 is covered by the dome portion 61 (sectioning member) from outside the housing 11. Since there is an outlet pipe 62 (second exhaust portion) provided to this dome portion 61, the blow-by gas that had been discharged from the gas discharge portion 24 has its flow rate reduced in the closed spaced formed by the dome portion 61 to be discharged from the outlet pipe 62. Since the flow rate declines in the closed space, the oil that was separated from the target gas loses its speed so that the oil is unlikely to be discharged from the outlet pipe 62. As a result, the efficiency in removing the oil contained in the blow-by gas can be enhanced.

The gas discharge portion 24 being configured with a cylindrical member protruding out into the closed space allows the oil separated from the target gas to flow along the outer surface of the gas discharge portion 24. For also this reason, a problem that the oil is discharged from the outlet pipe 62 can be suppressed.

The cap member 12 has the dome portion 61 configured in a hemispherical form and the outlet pipe 62 is configured as a cylindrical member that has its axis disposed away from the axis of the gas discharge portion 24, and the flow passage control piece 63 (flow passage control portion) is provided to the inner surface of the dome portion 61 to protrude between a location where the gas discharge portion 24 opposes and a location where the outlet pipe 62 is formed. Such configuration allows the oil separated from the blow-by gas to be restrained by the flow passage control piece 63 from flowing into the outlet pipe 62 even when this oil splatters upward from inner surface of the gas discharge portion 24. As a result, a problem that oil id discharged from the outlet pipe 62 can be restrained.

The dome portion 61 has at the inner surface thereof a plurality of guide ribs 64 disposed to protrude in the radial directions from the center location of the dome portion 61 in plan view such that the oil separated from the blow-by gas can have the flow direction of the oil controlled by these guide ribs 64 even when the oil were to be dispersed from the inner surface of the gas discharge portion 24. Hereby, the oil is unlikely to flow into the outlet pipe 62 and thus a problem that the oil together with the blow-by gas being discharged from the outlet pipe 62 can be restrained.

Further, the gas discharge portion 24 also functions as the downstream side flow passage of the PCV valve 33 so that the configuration of the gas discharge portion 24 can be simplified.

Furthermore, the oil separator 2 of the present embodiment has the lower chamber 45 function as the primary separation chamber that primarily separates the oil mist contained in the blow-by gas that has flown in from outside and the upper separation chamber functions as the secondary chamber that secondarily separates the oil contained in the blow-by gas that had the oil mist primarily separated so that the problem that oil is discharged from the outlet pipe 62 can be restrained also in this way.

The description of the above-described embodiment is for ease of understanding of the present invention and does not limit the present invention. The present invention may be modified or improved without departing from the gist and includes the equivalents. For example, the present invention may be configured as follows.

Figure 12:
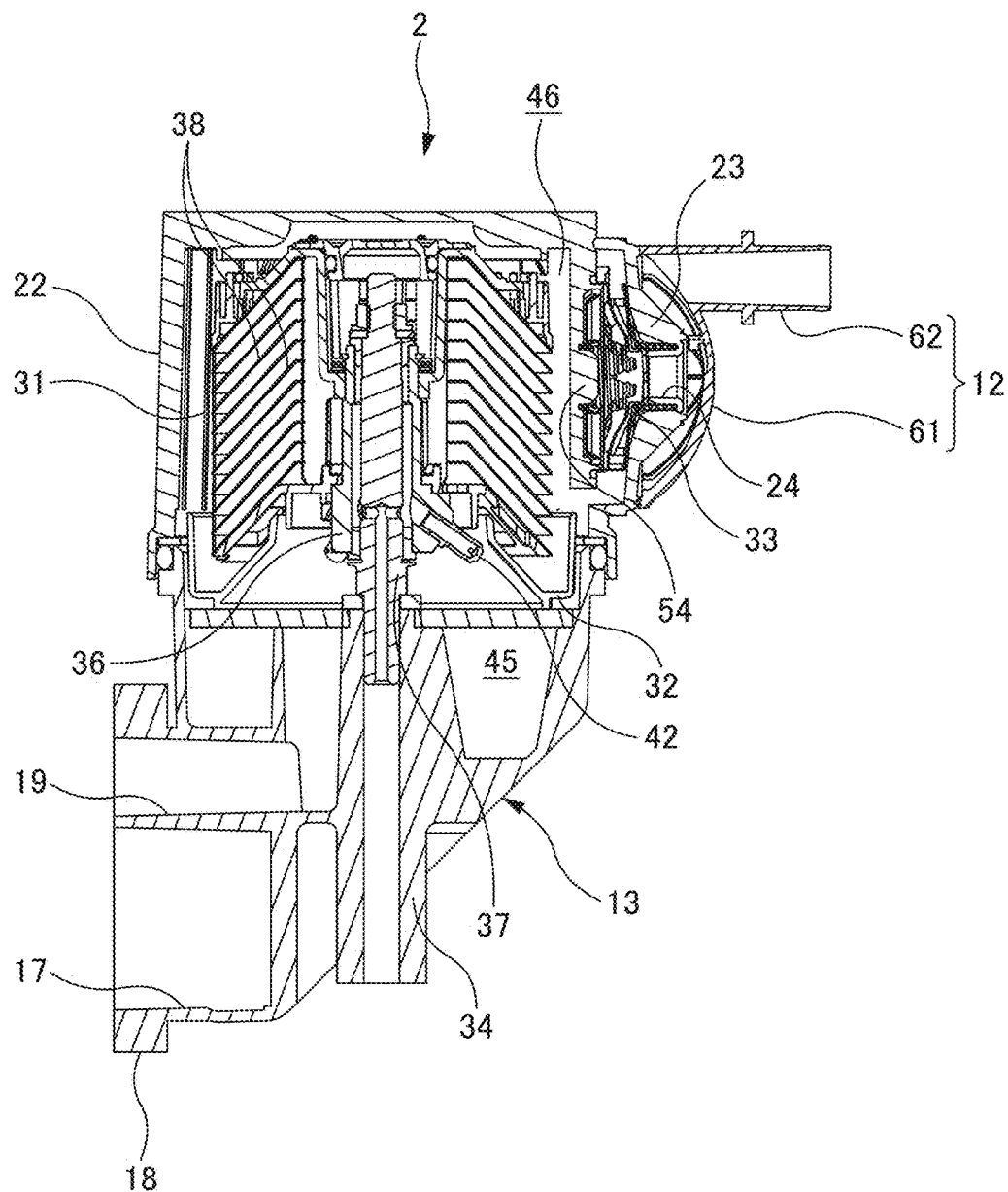
FIG. 12 is a view illustrating another embodiment having a PCV valve and a cap member disposed on a side face of the housing.

Another embodiment illustrated in FIG. 12 is characterized to be configured such that the PCV valve 33 and the cap member 12 are provided on the side face of the housing 11. The members in FIG. 12 that have been described in the first embodiment are attached similar reference signs and explanations thereof are omitted. Operational advantages similar to the first embodiment can be achieved in this way even when the PCV valve 33 and the cap member 12 are provided on the side face of the housing 11.

Further, the cap member 12 was exemplified to have a hemispherical dome portion 61 in the aforementioned embodiments, however, the shape is not limited to a hemispherical shape. The dome portion 61 may be configured in a truncated cone shape or may be configured in a petri dish shape or in a box shape.

The dome portion 61 was exemplified to have a plurality of guide ribs 64 radially provided on the inner surface in the aforementioned embodiments, however, the configuration is not limited to such. For example, the guide ribs 64 need not be provided.

The outlet pipe 62 may be provided to any location of the dome portion 61 as long as the axis of the outlet pipe 62 is provided at a location away from the axis of the gas discharge portion 24.

REFERENCE SIGNS LIST 1 closed crankcase ventilation system, 2 oil separator
3 breather pipe, 4 engine, 5 intake-side flow passage
6 air filter, 7 turbocharger, 8 charge cooler
9 oil supply pipe, 11 housing, 12 cap member, 13 lower case
14 upper case, 15 fitted portion in lower case
16 lower end portion in upper case
17 communication tube portion, 18 flange
19 guide tube portion, 21 middle portion of lower case
22 body cover of upper case, 23 top surface cover of upper case
24 gas discharge portion of top surface cover (first exhaust portion)
25 plate portion of top surface cover
26 drain hole of top surface cover
31 rotor unit, 32 communication port forming member
33 PCV valve, 34 joint, 35 rotor, 36 spindle
37 spindle shaft, 37a oil supply passage, 38 separation disk
39 upper holder, 40 lower holder, 41 coupling arm
42 nozzle, 43 nozzle body, 44 injection hole
45 lower chamber, 46 upper chamber
47 communication port, 48 outer peripheral portion
49 tapered portion, 50 collar portion
51 diaphragm, 52 upper spring
53 lower spring
54 pedestal portion, 55 air communicating portion
56 communicating window
61 dome portion of cap member (sectioning member)
62 outlet pipe of cap member (second exhaust portion)
63 flow passage control piece of cap member
64 guide rib

The invention claimed is:
1. An oil separator including a cylindrical housing that accommodates a rotor and that is provided with a first exhaust portion, the oil separator being configured to introduce target gas from a rotation center side of the rotor to condense an oil mist contained in the target gas as well as configured to emit condensed oil from an outer peripheral edge of the rotor and further being configured to discharge from the housing through the first exhaust portion the target gas after having the oil mist separated, the oil separator comprising:

a sectioning member that covers from an outside of the housing the first exhaust portion and sections a closed space around the first exhaust portion; and a second exhaust portion that is provided to the sectioning member and that discharges the target gas from the closed space that is sectioned by the sectioning member, wherein the first exhaust portion is configured with a cylindrical member that protrudes out in the closed space, the sectioning member is configured in a hemispherical shape, the second exhaust portion is a cylindrical member that has an axis provided at a location away from an axis of the first exhaust portion, and a flow passage control portion is provided, in a protruding manner between a location that opposes the first exhaust portion and a location where the second exhaust portion is formed, at an inner surface of the sectioning member.

2. The oil separator according to claim 1, further comprising a plurality of ribs that are respectively provided, at the inner surface of the sectioning member, in a protruding manner in a radial direction from a center location of the sectioning member in plan view.

3. The oil separator according to claim 1, wherein the first exhaust portion configures a downstream side flow passage of a PCV valve.

4. An oil separator including a cylindrical housing that accommodates a rotor and that is provided with a first exhaust portion, the oil separator being configured to introduce target gas from a rotation center side of the rotor to condense an oil mist contained in the target gas as well as configured to emit condensed oil from an outer peripheral edge of the rotor and further being configured to discharge from the housing through the first exhaust portion the target gas after having the oil mist separated, the oil separator comprising:

a sectioning member that covers from an outside of the housing the first exhaust portion and sections a closed space around the first exhaust portion;

a second exhaust portion that is provided to the sectioning member and that discharges the target gas from the closed space that is sectioned by the sectioning member:

a spindle that serves as a rotation center of the rotor;

a spindle shaft that rotatably supports the spindle and has formed on an inner side an oil supply passage that is configured to supply an oil, a nozzle that is provided to the spindle in a protruding manner from a circumferential face that is on a lower side of the rotor and that rotates the spindle about an axis by injecting the oil; and a communication port forming member that is disposed between the spindle shaft and the nozzle, sections an interior space of the housing into a primary separation chamber that makes oil ejected from the nozzle to flow downward and primarily separates the oil mist contained in the target gas that has flown in from an outside and a secondary separation chamber that has the rotor disposed and secondarily separates the oil mist contained in the target gas having the oil mist primarily separated, and forms a communication portion that guides the target gas in the primary separation chamber to the secondary separation chamber as well.

\* \* \* \* \*